(12) United States Patent
Yamazaki

(10) Patent No.: US 6,895,515 B1
(45) Date of Patent: May 17, 2005

(54) COMPUTER AND POWER CONTROL METHOD FOR EXECUTING PREDETERMINED PROCESS IN SAID COMPUTER PRIOR TO TURNING OFF ITS POWER

(75) Inventor: Mitsuhiro Yamazaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 09/662,666

(22) Filed: Sep. 15, 2000

(30) Foreign Application Priority Data

Sep. 16, 1999 (JP) .......................................... 11-261998

(51) Int. Cl.⁷ .............................................. G06F 1/26
(52) U.S. Cl. ........................................ 713/300; 713/1
(58) Field of Search ............... 713/1, 2, 100, 713/300, 310

(56) References Cited

U.S. PATENT DOCUMENTS 6,065,121 A * 5/2000 Hobson et al. ............. 713/300
6,308,278 B1 * 10/2001 Khouli et al. ............... 713/323
6,360,327 B1 * 3/2002 Hobson ...................... 713/300

* cited by examiner

*Primary Examiner*—Dennis M. Butler
(74) *Attorney, Agent, or Firm*—Thomas A. Beck; Louis P. Herzberg

(57) ABSTRACT

The invention realizes the execution of a predetermined process just before the turn-off of the power of a computer, without incurring increase in the load.

A shutdown reset logic 52 is provided between a power management unit 68 on a core chip and a power circuit 54. The logic 52 is enabled just before the system is shut down, and it interrupts the inputting of a power-off signal –SUSC output from the power management unit 68 to the power circuit 54, inputs a signal LAST#PWG#PIIX4 representing a faulty power state to the power management unit 68 to cause a hardware reset, and inputs a signal –PERSW#PIIX4 representing the turn-on of a power switch 92. This causes the POST to be started, and the POST turns off the power of the system after enabling the WOL function of the network adapter.

4 Claims, 8 Drawing Sheets

COMPUTER AND POWER CONTROL METHOD FOR EXECUTING PREDETERMINED PROCESS IN SAID COMPUTER PRIOR TO TURNING OFF ITS POWER

DETAILED DESCRIPTION OF THE INVENTION

1. Field of the Invention

The present invention relates to a computer and a power control method for computer, and particularly to a power control method for computer in which a predetermined process is executed just before the power of a computer is turned off, and a computer to which such power control method is applied.

2. Background of the Invention

In a personal computer (PC), there is provided a chip on which a logic (hereinafter referred to as "state machine") is mounted for controlling the power state of the PC including the operation of an internal register for storing the current power state of the PC (hereinafter referred to as "core chip"), and the power state management of the PC including the power-on/off is carried out by the state machine of the core chip. The interface (I/F) with the state machine of the core chip is standardized, and in a PC compliant with the ACPI (Advanced Configuration and Power Interface) standard, the control of the I/F with the state machine is managed by an operating system (OS). And, the power-off of the PC is performed by instructing a power unit to turn off the power through the state mechanism after the OS executes various termination processes related to the power-off.

Thus, if, in a PC compliant with the ACPI standard, a special process is executed by BIOS (Basic Input/Output System: a program for controlling the input/output operation of each hardware such as keyboard or floppy disk drive) such as AML (a group of codes for performing a system-oriented process described using ASL (ACPI Source Language))(ACPI Machine Language: part of BIOS) when the power of the PC is turned off, there is a problem that the processing by BIOS may be invalidated by the termination process of the OS executed after the processing by them.

As an example, there has been known a function which allows the administration of a LAN (Local Area Network) connected to a PC in a power-off state to remotely turn on the power of the PC (hereinafter referred to as WOL (Wake On LAN) function) through LAN, but, to use this WOL function, the WOL function of the network adapter of the PC needs to be previously enabled.

In the PC compliant with the ACPI standard, however, there has been the following problem. To shut down a computer system, OS disables the power-on factors (including the power-on by the above described WOL function) other than turn-on of the power switch just before the power of the PC is turned off, and thus, even if the turn-off of the power of the PC is detected and the WOL function is enabled by BIOS, the WOL function is disabled by the termination process of the OS and the power is turned off, so the WOL function can not be used.

OBJECTS OF THE INVENTION

To solve the above described problems, it is needed to carry out a special process such as enabling the WOL function after the execution of the termination process of the OS, but it is required that a new mechanism be provided to execute the special process after the execution of the termination process of the OS, because the current OS is not provided with an I/F for starting a program for carrying out the special process after the execution of the termination process.

As an example of the above described mechanism, it is possible that, using the I/O trap function, an interruption is caused to start a predetermined program (for instance, BIOS) each time the internal register in the core chip (a register operated by the state machine) is accessed, and a special process is executed if it is determined that the current timing is the timing just before the power-off of the PC, based on the address at which the access was made and the contents written to that address.

However, the above-described method has a problem that the load put on the CPU of the PC increases, because interruption is caused to start the predetermined program each time the internal register of the core chip is accessed. Further, since the operation of the OS stops when the CPU is executing the predetermined program, it is also required to design the predetermined program so that the process completes within a short time which does not make an effect on the operation of the OS, resulting in the necessity of a large amount of works such as design and verification.

The present invention has been made in view of the above described fact, and its object is to obtain a computer and a power control method for computer which enable a predetermined process to be executed just before the turn-off of the power of the computer, without causing increase in the load, or the like.

SUMMARY OF THE INVENTION

The computer related to the present invention comprises control means for interrupting an input of a power-off instruction into a power unit to supply power to the computer when the power-off instruction is output to the power unit in response to an instruction from an operating system, and for generating a hardware reset of the computer. As described above, by interrupting the input of a power-off instruction to the power unit, power is continued to be supplied to the computer by the power unit. Further, by the hardware reset starts up a process routine (processing means related to the present invention), which is not usually started up in the ordinary sequence of the power-off of a computer.

And, in the present invention, the power of the computer is turned off by the processing means started by the hardware reset after the execution of a predetermined process. Since the power-off instruction to the power unit is output according to instructions from the operating system after the completion of the process by the operating system to turn off the power of the computer, the predetermined process can be carried out just before the turn-off of the power of the computer (that is, after the completion of the process by the operating system).

Since the power-off instruction to the power unit is output only once when turning off the power of the computer and the control means related to the present invention can be configured by hardware, the load imposed on the CPU of the computer does not increase unlike the case in which interruption is caused each time access is made to a particular register. Accordingly, in accordance with the present invention, the execution of a predetermined process just before the turn-off of the power of the computer can be realized without incurring increase in the load.

As described above, when the power-off instruction to the power unit is output, the process by the operating system for turning off the power of the computer has been completed, and thus, there is no harm in the process by the operating system even if a hardware reset is generated when the power-off instruction is output. Further, the processing means related to the present invention can comprise software, and the start-up of the processing means by a hardware reset can be implemented, for instance, by embedding that software in BIOS started upon the occurrence of a hardware reset (so-called POST: Power On Self Test).

In addition, the power-off instruction to the power unit is usually output from a power management unit for controlling the power state of the computer according to instructions from the operating system. In this case, the processing means can be provided between the power management unit for controlling the power state of the computer and the power unit, and can be configured to interrupt the inputting of the power-off instruction output from the power management unit to the power unit.

Furthermore, since the power management is usually configured to generate a hardware reset when it recognizes that the power state is faulty, to generate the hardware reset of the computer upon the outputting of a power-off instruction to the power unit in an embodiment in which the control means is provided between the power management unit for controlling the power state of the computer and the power unit, the control means is preferably configured so that, when a power-off instruction is output from the power management unit, a dummy power state signal representing a faulty power state is output to the power management unit to generate a hardware reset, and thereafter a dummy power-on signal representing an instruction of power-on is output to the power management unit.

As described above, since a hardware reset can be generated by outputting a dummy power state signal representing a faulty power, the construction of the control means can be simplified. Further, the power management unit continues to output the power-off instruction to the power unit when instructed from the operating system to turn off the power, but the outputting of the power-off instruction to the power unit can also be stopped by outputting the dummy power-on signal representing an instruction of power-on.

There is a mismatch between the power state of the computer controlled by the power management unit and the actual power state due to the effect of a dummy power state signal, but, if a dummy power state signal representing a good power state is output, the power state of the computer controlled by the power management unit is changed, and the mismatch can be dissolved.

Moreover, if the predetermined process related to the present invention is a process to be fixedly executed when the power of the computer is turned off, the control means related to the present invention may always be operated, but, if the predetermined process related to the present invention is a process to be executed only when instructed (for instance, a process for changing the setting of the network adapter to enable the function to remotely turn on the power of the computer through a network, or the like), the processing means preferably enables the control means and stores predetermined information in a nonvolatile memory when the execution of the predetermined process is indicated and the execution of a process for turning off the power of the computer by an operating system is detected.

This allows a hardware reset to be generated when the power of the computer is turned off, only if the execution of the predetermined process is instructed. Further, by storing predetermined information in a nonvolatile memory means (for instance, CMOS (a memory connected to a backup power supply) or EEPROM), it can easily be determined whether it is a usual hardware reset or a hardware reset for executing the predetermined process, based on whether or not predetermined information is stored in the memory means, when the processing means is started by the hardware reset, and if it is started by a hardware reset and predetermined information is stored in the memory means, the power of the computer can be turned off after the predetermined process is executed and the operation of the control means is stopped.

Further, as the computer related to the present invention, a computer compliant with the ACPI standard is preferred, for instance.

Since the power control method for computer related to the present invention interrupts the inputting of a power-off instruction to a power unit for supplying power to a computer when the power-off instruction is output to the power unit according to instructions from an operating system, and generates a hardware reset of the computer, and turns off the power of the computer after executing a predetermined process in a process routine started by the hardware reset, the execution of the predetermined process just before the turn-off of the computer can be realized without incurring increase in the load, or the like as described previously.

DESCRIPTION OF THE PREFERRED EMBODIMENT

Figure 1:
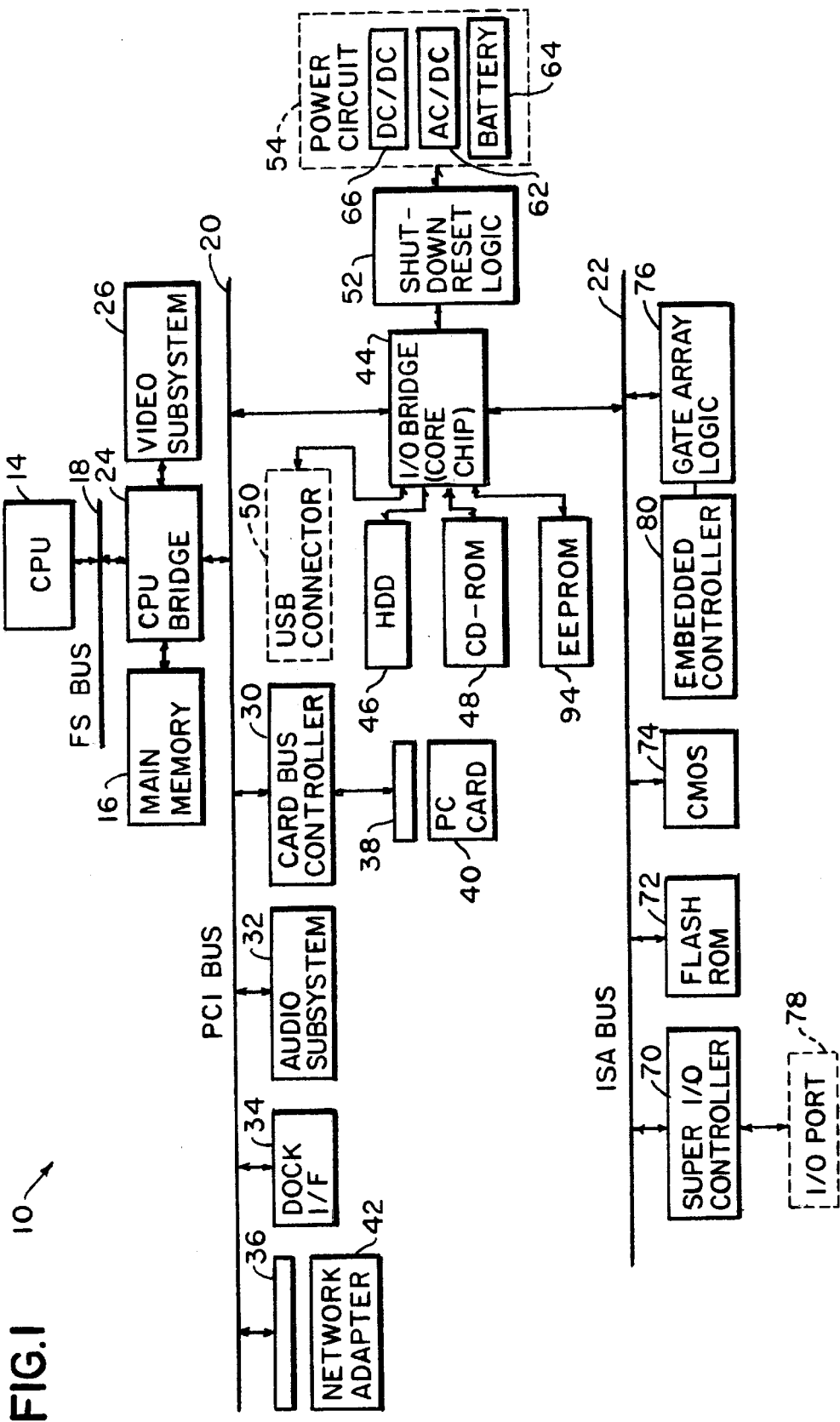
FIG. 1 is a block diagram showing the schematic construction of the computer system related to this embodiment.

To assist in the description of the preferred embodiment as set forth hereinafter, the following numbers represent the elements noted.

10 . . . Computer system
14 . . . CPU
42 . . . Network adapter
44 . . . I/O bridge
52 . . . Shutdown reset logic
54 . . . Power circuit
56 . . . Power-off signal gate logic
58 . . . Power good signal control logic
60 . . . Power switch signal control logic
68 . . . Power management unit
74 . . . Network Adapter
76 . . . Gate array logic
80 . . . Embedded controller An example of the embodiment of the present invention is described in detail with reference to the drawings.

Figure 2:
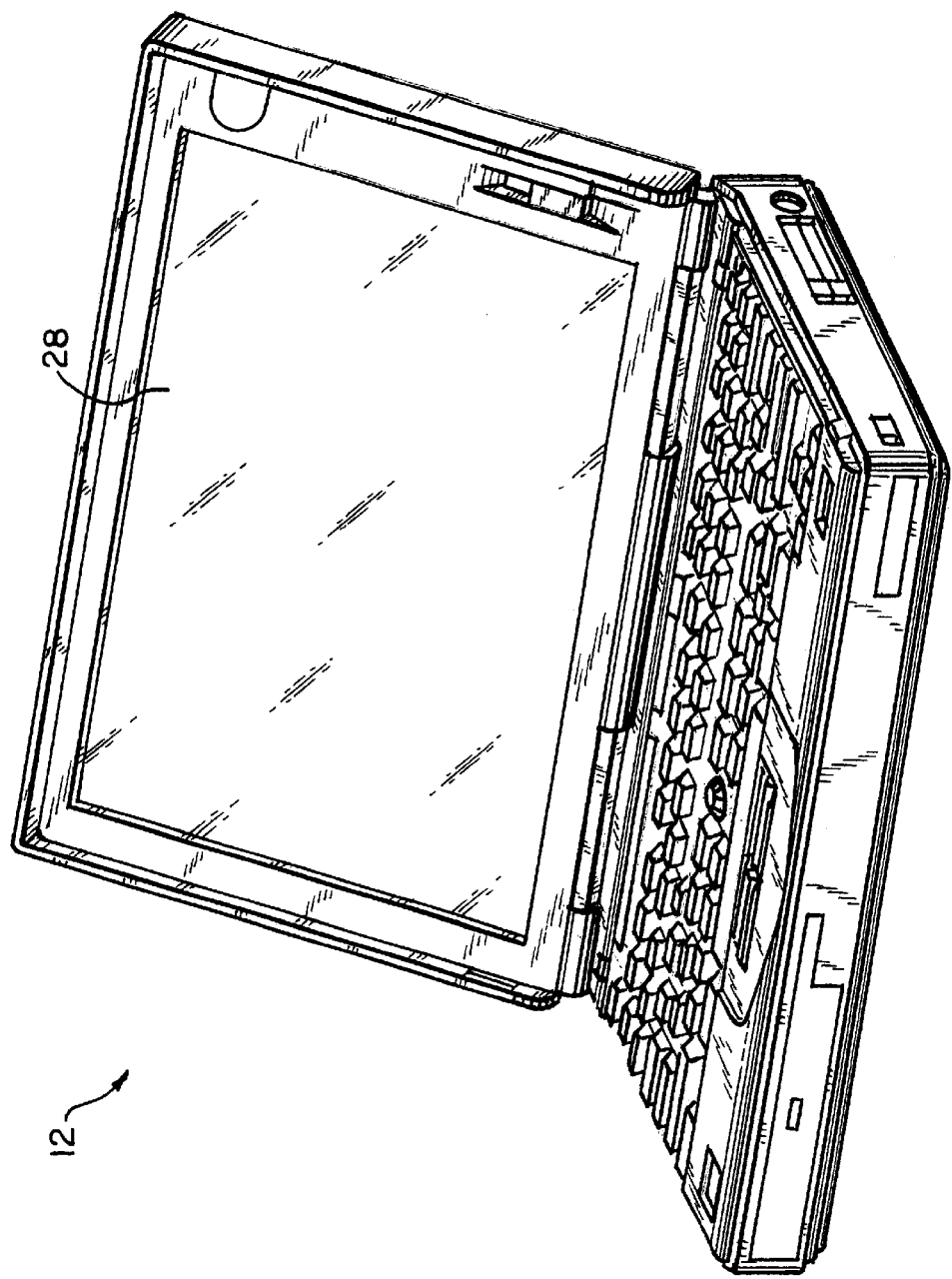
FIG. 2 is a perspective view showing the appearance of a notebook PC.

In FIG. 1, the hardware configuration of a computer system 10 comprising a typical personal computer (PC) suitable for implementing the present invention is diagrammatically shown for each subsystem. An example of the PC for implementing the present invention is a notebook type PC 12 (refer to FIG. 2) which is compliant with the specification of OADG (PC Open Architecture Developer's Group), and on which "Windows 98 or NT" of Microsoft Corporation, U.S.A. or "OS/2" of IBM, U.S.A. is mounted as an operating system (OS). Each part of the computer system 10 is described below.

A CPU 14, the brain of the whole computer system 10, executes various programs under the control of the OS. The CPU 14 may be, for instance, the CPU chip "Pentium," MMX technology Pentium," or "Pentium Pro" of Intel Corp., or CPUs made by other companies such as AMD Inc., or "Power PC" made by IBM. The CPU 14 comprises an L2 (level 2)-cache, which is a high-speed memory for shortening the total access time to a main memory 16 by temporarily storing very limited codes or data which are frequently accessed. The L2-cache is usually formed from an SRAM (static RAM) chip, and its storage capacity is, for instance, 512 kB or larger.

The CPU 14 is interconnected to each component described later through a three-layer bus of a FS (Front Side) bus 18 as a bus directly connected to the processor, which is directly connected to the external pin of itself, a PCI (Peripheral Component Interconnect) bus 20 as a bus for high-speed I/O devices, and an ISA (Industry Standard Architecture) bus 22 as a bus for low-speed I/O devices.

The FSB 18 and the PCI bus 20 are connected to each other by a CPU bridge (host—PC I bridge) 24 commonly called a memory/PCI control chip. The CPU bridge 24 of this embodiment comprises a memory controller function for controlling the access operation to the main memory 16, a data buffer for absorbing the difference in the data transfer speed between the FSB 18 and the PCI bus 20, and the like, and 440BX made by Intel Corp., or the like can be used, for instance.

The main memory 16 is a writable memory which is used as an area into which an execution program of the CPU 14 is read, or a work area to which the processed data of an execution program is written. The main memory 16 generally consists of a plurality of DRAM (dynamic RAM) chips, and comes standard with, for instance, 32 MB, which is expandable to 256 MB. In recent years, to fulfill a demand for speed-up, the DRAM has changed to high-speed page DRAM, EDO DRAM, synchronous DRAM (SDRAM), burst EDO DRAM, RDRAM, and the like.

The execution programs mentioned here include OS such as windows 98, various device drivers for hardware operation of peripheral equipment, application programs directed to specific applications, and firmware such as BIOS stored in the flash ROM 72.

The PCI bus 20 is a bus of the type capable of relatively fast data transfer (for instance, bus width: 32/64 bits, maximum operation frequency: 33/66/100 MHz, maximum data transfer speed: 132/264 MBps), and PCI devices such as a card bus controller 30 driven at a relatively high speed are connected to it. The PCI architecture originated in the proposal by Intel Corp., U.S.A., and it realizes a so-called PnP (Plug and Play) function.

A video subsystem 26 is a subsystem for realizing the function related to video, and it includes a video controller, which actually processes a drawing instruction from the CPU 14, temporarily writes the processed drawing information to a video memory (VRAM), and reads out the drawing information from the VRAM and outputs it to a liquid crystal display (LCD) 28 (refer to FIG. 2) as drawing data. Further, the video controller can convert a digital video signal to an analog video signal by the digital-to-analog converter (DAC) attached to it. The analog video signal is output to a CRT port (not shown) via a signal line.

Further, to the PCI bus 20, the card bus controller 30, an audio subsystem 32, a docking station interface (Dock I/F) 34, and a mini PCI slot 36 are connected, respectively. The card bus controller 30 is a dedicated controller for directly connecting the bus signal of the PCI bus 20 to the interface connector (card bus) of the PCI card bus slot 38. The card bus slot 38 is disposed, for instance, in the wall surface of the main body of the PC 12, and a PC card 40 compliant with the specification defined by PCMCIA (Personal Computer Memory Association)/JEIDA (Japan Electronic Industry Development Association) (for instance, PC Card Standard 95") is loaded into it.

Figure 4:
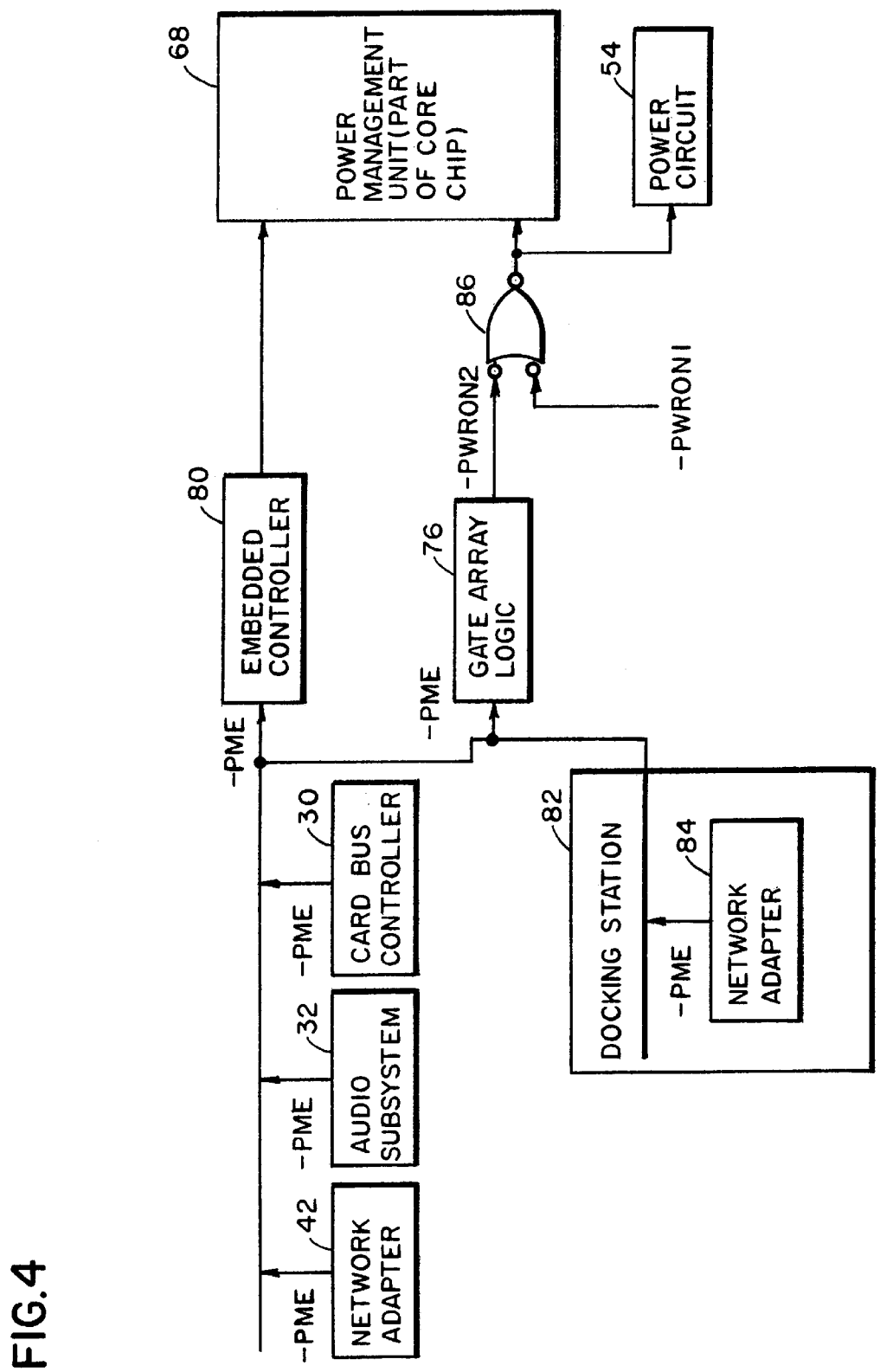
FIG. 4 is a schematic block diagram showing an example of a signal line –PME and the hardware components connected to the signal line –PME, and for explaining the operation of restoration from the power state S1–S5 and G3 to the power state S0.

The dock I/F 34 is hardware for connecting the PC 12 and a docking station (not shown), and when the PC 12 is set on the docking station, the internal bus of the docking station is connected to the dock I/F 34, and the various hardware components connected to the internal bus of the docking station (for instance, the network adapter 84 of a docking station 82 shown in FIG. 4) are connected to the PCI bus 20 through the dock I/F 34. Further, to the mini PCI slot 36, for instance, a network adapter 42 for connecting the computer system 10 to a network (for instance, LAN) is connected.

In the network adapters 42 and 84 related to this embodiment, there is provided a circuit for implementing a WOL function, which enables the administrator of the LAN connected to the PC 12 through the network adapters to remotely turn on the power of the PC 12 in a power-off state through the LAN. In the network adapters 42 and 84, there is provided a WOL setting area for enabling/disabling the WOL function, and the WOL function is enabled to be used by writing information representing the enabling of the WOL function to the WOL setting area in the internal register (corresponding to the predetermined process of the present invention).

The PCI bus 20 and an ISA bus 22 are interconnected by an I/O bridge 44. The I/O bridge 44 includes the function as a bridge between the PCI bus 20 and the ISA bus 22, a DMA controller function, a programmable interruption controller (PIC) function, a programmable interval timer (PIT) function, an IDE (Integrated Drive Electronics) interface function, a USB (Universal Serial Bus) function, and an SMB (System Management Bus) interface function, and also includes a real time clock (RTC), and for instance, a device (core chip) called PIIX4 made by Intel Corp. can be used.

The DMA controller function is a function for carrying out the data transfer between the peripheral equipment (for instance, FDD) and the main memory 16 without intervention of the CPU 14. Further, the PCI function is a function for executing a predetermined program (interruption handler) in response to an interruption request (IRQ) from peripheral equipment. Furthermore, the PIT function is a function for generating a timer signal at a predetermined interval, and the generation frequency is programmable.

In addition, to the IDE interface realized by the IDE interface function, an IDE hard disk drive (HDD) 40 is connected, and an IDE CD-ROM drive 48 is also connected by ATAPI (AT Attachment Packet Interface) connection. Further, instead of the IDE CD-ROM drive 48, an IDE device of another type such as a DVD (Digital Video Disc or Digital Versatile Disc) drive may be connected. The external storage device such as the HDD 46 or CD-ROM drive 48 is accommodated, for instance, in a housing called "media bay" or "device bay" in the main body of the PC 12. These external storage devices as standard equipment may be exchangeably and exclusively with other equipment such as FDD and battery pack.

Further, there is provided a USB port in the I/O bridge 44, and this USB port is connected to a USB connector 50 provided, for instance, in the wall surface of the main body of the PC 12, or the like. The USB supports a function of attaching and removing a new peripheral device (USB device) while the power is on (hot plugging function), and a function of automatically recognizing a newly connected peripheral device and resetting the system configuration (plug-and-play function). To one USB port, 63 USB devices can be daisy-chained at maximum. The USB device includes various examples such as keyboard, mouse, joy stick, scanner, printer, modem, display monitor, and tablet.

Further, to the I/O bridge 44, an EEPROM 94 is connected through an SM bus. The EEPROM 94 is a memory for holding information such as the password or supervisor password registered by the user, and product serial number, and it is nonvolatile and its storage contents can be electrically rewritten.

Figure 3:
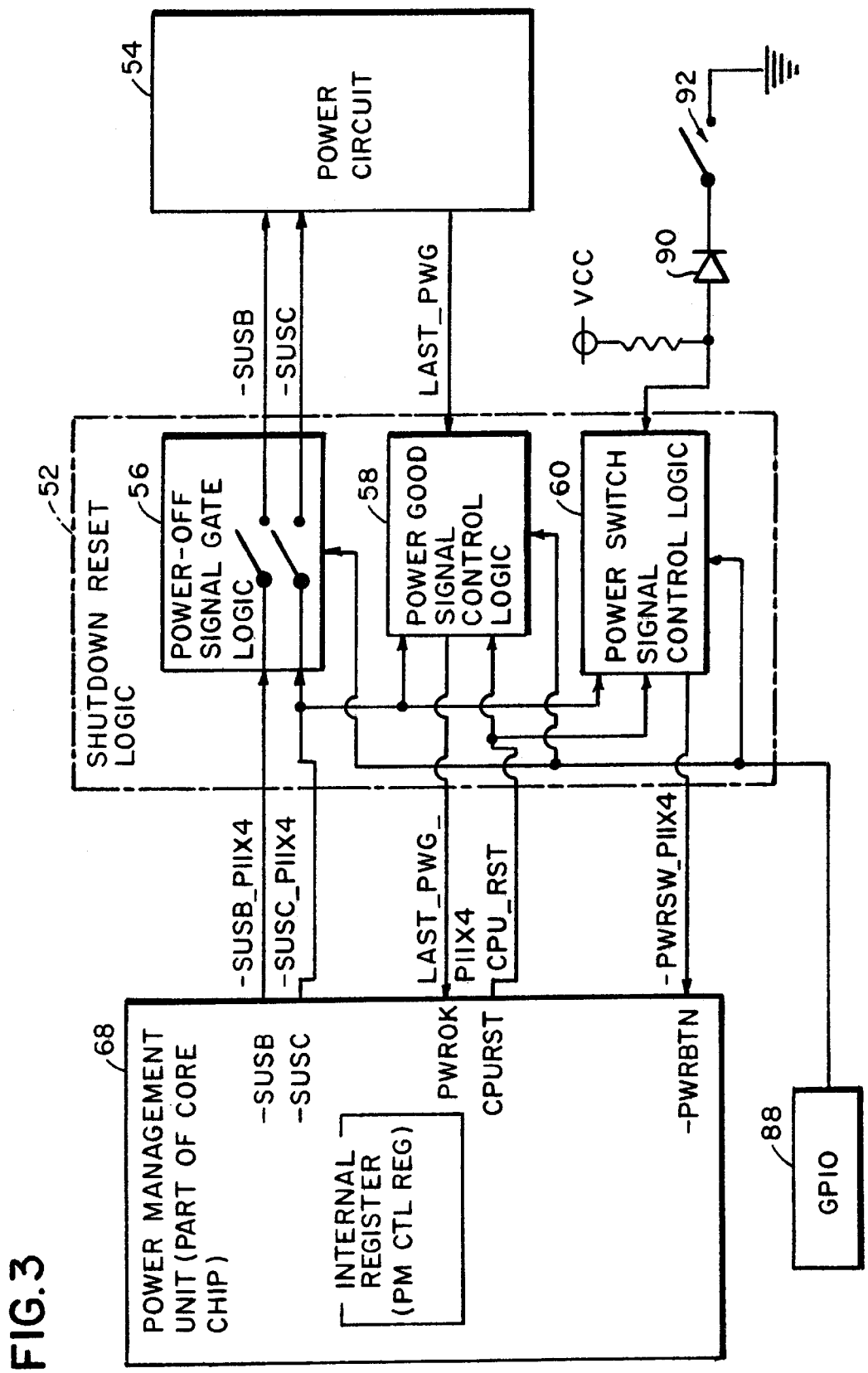
FIG. 3 is a schematic block diagram showing the construction of the shutdown reset logic.

Further, the I/O bridge 44 is connected to a power circuit 54 (corresponding to the power unit related to the present invention) via a shutdown reset logic 52. As shown in FIG. 3, the power circuit 54 includes circuits such as an AC/DC converter 62, a charger for charging a battery 64, and a DC/DC converter 66 for generating a d.c. constant voltage such as 5 V or 3.3 V used in the computer system 10. On the other hand, in the core chip forming the I/O bridge 44, there are provided an internal register PM CTL REG for controlling the power state of the computer system 10, and a logic for controlling the power state of the computer system 10 including the operation of the internal register PM CTL REG (state machine) (hereinafter this internal register and logic are generically named a power management unit 68).

The power management unit 68 and the power circuit 54 send and receive various signals through the shutdown reset logic 52, and by the signal sending and receiving, the power management unit 68 recognizes the actual state of supply of power from the power circuit 54 to the computer system 10, and the power circuit 54 controls the supply of power to the computer system 10 according to instructions from the power management unit 68.

The shutdown reset logic 52 corresponds to the control means of the present invention, and it comprises hardware components such as a power-off signal gate logic 56, the power good signal control logic 58, and a power switch signal control logic 60. The shutdown reset logic 52 is enabled/disabled for operation by the BIOS through a GPIO 88, and when disabled, it directly transmits signals sent and received between the power management unit 68 and the power circuit 54. The operation of the respective logic of the shutdown reset logic 52 when enabled is described later.

The ISA bus 22 is a bus whose data transfer speed is lower than the PCI bus 20 (for instance, bus width: 16 bits, maximum data transfer speed: 4 MBps), and it is used to connect peripheral equipment operating at a relatively low speed such as a keyboard/mouse controller (both not shown) as well as a super I/O controller 70, a flash ROM 72 made of an EEPROM or the like, a CMOS 74, and a gate array logic 76.

An I/O port 78 is connected to the super I/O controller 70. The super I/O controller 70 controls the driving of a floppy disk drive (FDD), the input/output of parallel data (PIO) through a parallel port, and the input/output of serial data (SIO) through a serial port.

The flash ROM 72 is a memory for holding a program such as BIOS, and it is nonvolatile and its storage contents can be electrically rewritten. Further, the CMOS 74 has a structure in which a semiconductor memory is connected to a backup power supply, and it functions as a volatile and fast memory means. In the storage area of the CMOS 74, there are provided a WOL function bit for holding a flag representing whether or not the WOL function is used, and a shutdown reset bit for holding a flag representing whether or not shutdown reset (to be described later) has been performed, and the above described flags and other various information are stored.

The gate array logic 76 is a logic for implementing the above described WOL function, and the embedded controller 80 connected to the gate array logic 76 controls the keyboard, now shown, and takes charge of part of the power management function in cooperation with the gate array logic 76.

Further, to construct the computer system 10, many additional electric circuits other than those shown in FIG. 1 are required. However, these are well known to a person skilled in the art and do not constitute the gist of the present invention, so the description of them is omitted in this specification. Furthermore, it is noted that only part of the connections between the respective hardware blocks in the drawings is shown to avoid confusion about the drawings.

Now, the operation of this embodiment is described. The computer system 10 related to this embodiment is a PC compliant with the ACPI standard, and as shown in Table 1 below, a plurality of power states (S0–S5, G3) are defined.

TABLE 1

| Power state | APM | Actual state | Condition for restoration to S0 |
|---|---|---|---|
| S0 | Operational | Operating | |
| S1 | Standby | Turn off power of some peripheral devices | Generation of predetermined event |
| S2 | | | |
| S3 | Suspend | Store operation state in memory and turn off power of peripheral devices | Generation of predetermined event |
| S4 | Hibernation | Store operation state in HDD and turn off power of main portions | Generation of predetermined event |
| S5 | SoftOFF | Turn off all the power except for power management unit of core chip | Only power switch-on |
| G3 | MechOFF | Also turn off power management unit | Only power switch-on |

"APM" in Table 1 represents the correspondence between the respective power states S0–S5 and G3 and the respective power states defined in the APM (Advanced Power Management) standard.

In the computer system 10 related to this embodiment, the restoration from the power states S1, S2, and S3 to the power state S0 is actualized by a signal line -PME (Power Management Event), which is a part of the PCI bus 20, and the embedded controller 80 connected to the signal line -PME. That is, as shown in FIG. 4, to the signal line -PME, the card bus controller 30, audio subsystem 32, and network adapter 42 are connected, and the network adapter 84 connected to the internal bus of the docking station 82 is also connected if the PC 12 is set on the docking station 82.

If the power circuit 54 is connected to an AC power supply, the embedded controller 80 and the gate array logic 76 are always supplied with power for any power state, and the signal line -PME is kept at a high level (inactive). Each hardware component connected to the signal line -PME puts the signal line -PME at a low level (active) if it detects the generation of a predetermined event to restore the power state of the computer system 10 to S0. The embedded controller 80 is connected to the power management unit 68 of the core chip (I/O bridge 44), and if it detects that the signal line -PME has become active, it notifies the power management unit 68 of the generation of the predetermined event to restore the power state to S0. Upon receipt of this notification, the power management unit 68 executes the predetermined process for restoring the power state to S0 (for instance, outputting of an instruction signal to the power circuit 54).

Further, to the power management unit 68 and power circuit 54, a signal line is connected so that a signal -PWRON01 generated by the turn-on of the power switch is inputted, and the restoration from the power states S4, S5, and G3 to the power state S0 can be actualized by the inputting of the signal -PWRON01 to the power management unit 68 and power circuit 54. For the power state S4, the restoration can also be made with a timer set to a real-time clock, included in the core chip (I/O bridge 44), being a trigger.

Furthermore, the gate array logic 76 related to this embodiment is provided to implement a WOL function for externally enabling the restoration to the power state S0 through a LAN and the network adapter 42 or 84 for the computer system 10 in the power state S4, S5, or G3.

That is, the input terminal of the gate array logic 76 is connected to the signal line -PME, and the output terminal of the gate array logic 76 is connected to the signal line of the signal PWRON01 through an OR circuit 86. The network adapters 42 and 84 make the signal line -PME active if instructed to execute WOL through a network while the WOL function is enabled, and if the gate array logic 76 is enabled at this point, the gate array logic 76 detects that the signal line -PME has become active, and the signal -PWRON02 is inputted to the power management unit 68 and the power circuit 54 via the OR circuit 86, as in the turn-on of the power switch. This causes the power management unit 68 and the power circuit 54 to operate, as in the turn-on of the power switch, and the computer system 10 in the power state S4, 5, G3 is restored to the power state S0.

As obvious from Table 1, according to the ACPM standard, the restoration from the power states S5 and G3 to the power state S0 is "only power-on of the power switch." For this, the OS compliant with the ACPM standard executes a process for ignoring the occurrence of events other than the turn-on of the power switch as the condition for restoration from the power state S5 or G3 to the power state S0 in the transition to the power state S5 or G3, and this process includes a process of writing information for disabling the WOL function to the WOL setting areas in the network adapters 42 and 84.

And, the above described process is carried out just before the OS gives instructions to stop the supply of power (turn off the power) to the computer system 10, and the power is turned off after the execution of the above described process without starting the BIOS, so it is difficult for the BIOS to rewrite the information once written to the WOL setting areas by the OS so that the WOL function is enabled. Thus, the BIOS related to this embodiment generates a hardware reset just before the transition to the power state S5 or G3 in cooperation with the shutdown reset logic 52, thereby to rewrite the information once written to the WOL setting areas.

Figure 5A:
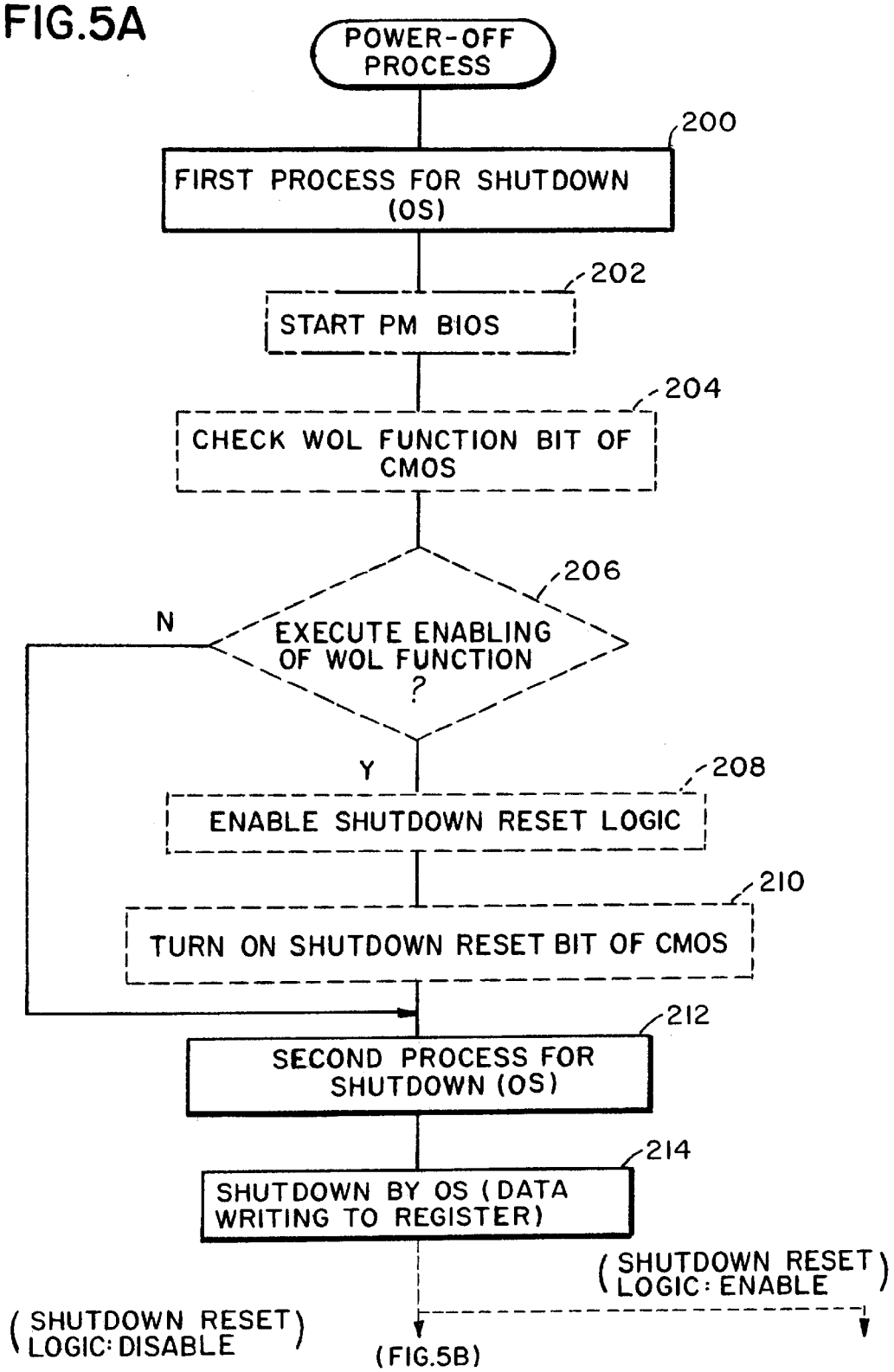
FIG. 5 is a flowchart showing the contents of the power-off process.
Figure 5B:
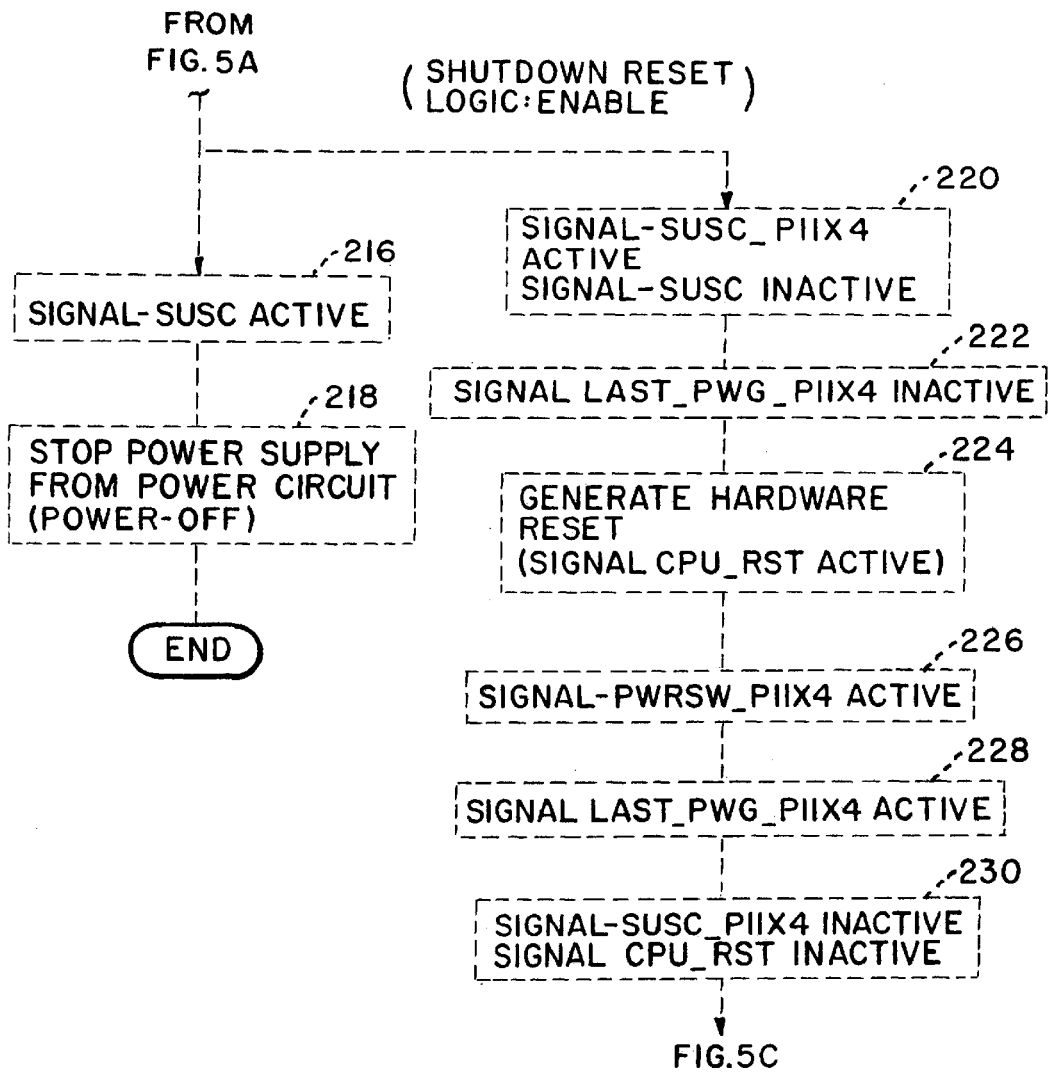
Figure 5C:
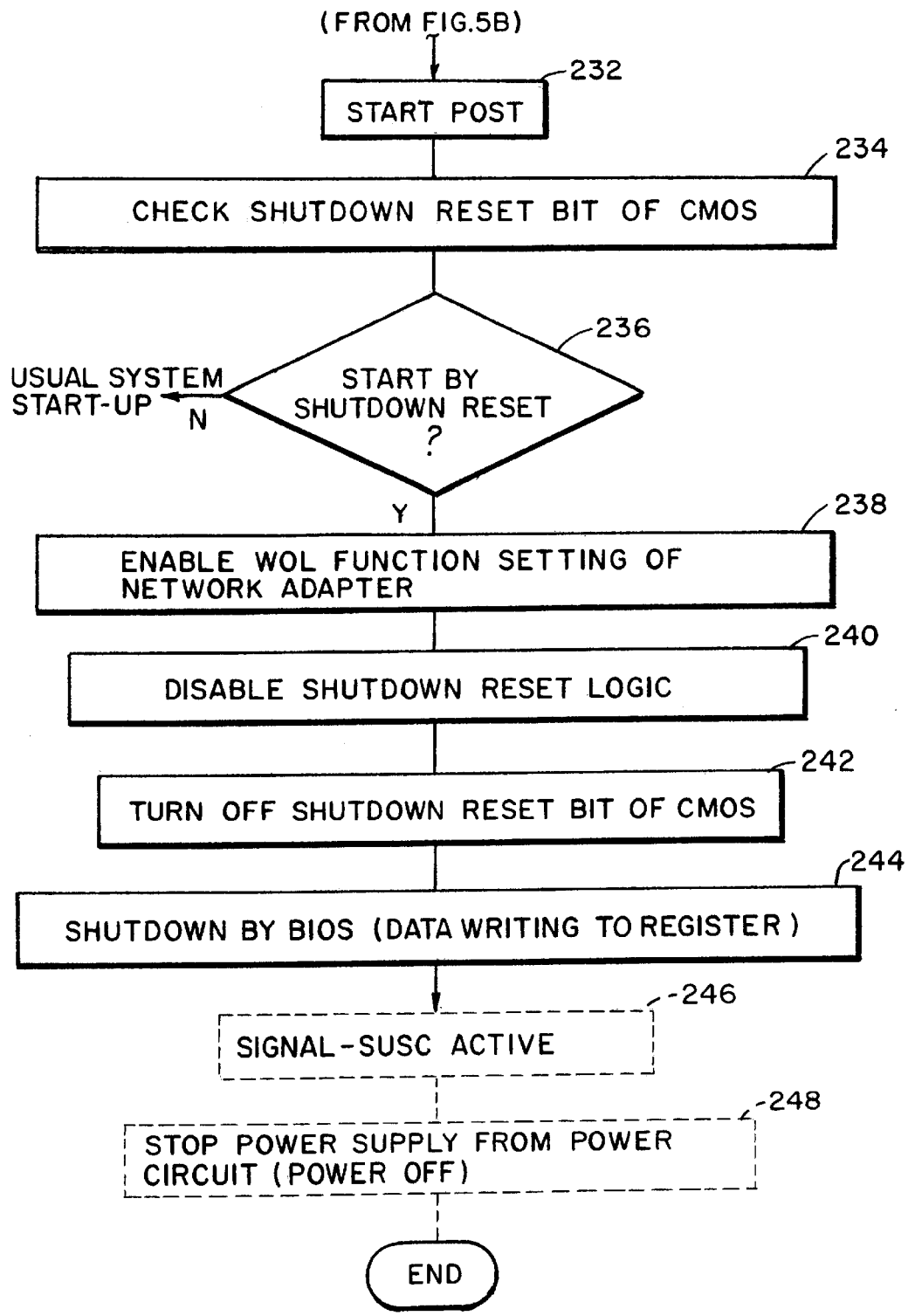

Now, with reference to the flowchart of FIG. 5, description is made to the power-off process that is carried out by the execution of the programs such as the OS and the BIOS related to this embodiment by the CPU 14 and the operation of the shutdown reset logic 52, when an event causing transition from the power state S0 (operating) to the power state S5 or G3 is detected (for instance, the power switch is turned off, or a power-off instruction is given on software by an operation of the keyboard or mouse, or the like).

In the flowchart of FIG. 5, the process by the hardware such as the shutdown reset logic 52, the process by the execution of the AML by the CPU 14, the process by the execution of the PM BIOS (Power Management BIOS) by the CPU 14, and the process by the execution of the POST by the CPU 14 are shown as distinguished from the process by the execution of other programs such as the OS by the CPU 14.

The AML, PM BIOS, and POST are all part of a program (code) generically named BIOS. The AML is a code that describes, by using the ASL language, what processes the OS executes as system-oriented processes under various conditions, with each of the various conditions being as a unit (called method), and the PM BIOS is a program started by an interruption called SMI (System Management Interrupt), and the POST is a program started when the power of the computer system 10 is turned on or a hardware reset is generated.

Upon detection of an event causing transition from the power state S0 to the power state S5 or G3, first, in step 200, the preprocessing to shut down the computer system 10 (the process for the OS to turn off the power of the computer: in this embodiment, it is divided into a first process and a second process for convenience of description) is executed by the OS specifically by the CPU 14 executing the program of OS). When the first process is terminated, the AML is called by the OS. For transition from the power state S0 to another power state, a method of AML, called PTS (Prepare To Sleep), is invoked along with a parameter representing the destination power state.

Specifically, the AML is obtained by using a special compiler to intermediately code a source code described using the ASL, and it is compressed and stored in the flash ROM 72 (or an ordinary ROM). When read out, it is expanded on the memory as a code to be read by the OS, and when the OS reads and executes the expanded code like an interpreter, the process described as the AML (in this case method PTS) is carried out.

In this embodiment, access to the CMOS 74 is made when the predetermined process for shutting down the computer system 10 is performed (the detail is described later), but, there is a restriction on the hardware operation in the AML, and it is difficult to access the CMOS 74. Thus, in this embodiment, the method PTS of the AML is configured so that an SMI (interruption) is caused in the method PTS to start another program of the BIOS that has less restriction on the hardware operation (specifically, PM BIOS), and in the next step 202, the PM BIOS is started by the method PTS of the AML, and the execution of the program of the PM BIOS by the CPU 14 actualizes the processes steps 204–210.

In step 204, the flag held in the WOL function bit of the CMOS 74 is checked, and in the next step 206, it is determined based on the value of that flag whether or not the process for enabling the WOL function of the network adapter 42 (or network adapter 84) is executed.

If the flag set in the WOL function bit of the CMOS 74 is a value representing the use of the WOL function, it can be determined that the execution of the process for using the WOL function (including a shutdown reset to be described later) is indicated. For this, in the above described case, the determination in step 206 is affirmed, and as the process for performing the shutdown reset, the shutdown reset logic 52 is enabled in step 208 through the GPIO 88 (this step 208 corresponds to activation of the control means related to the present invention), and in the next step 210, the value of the flag held in the shutdown reset bit of the CMOS 74 is changed to a value representing that the shutdown reset has been made (this step 210 corresponds to the storing of predetermined information in the nonvolatile memory means related to the present invention).

Further, if the flag set in the WOL function bit of the CMOS 74 is a value indicating that the WOL function is not used, the determination in step 206 is denied and the processes in steps 208 and 210 are not performed, and the shutdown reset logic 52 is kept to be disabled to interrupt the shutdown reset.

When the above described process is carried out, control is returned to the OS, and in the next step 212, the postprocessing for shutting down the computer system 10 (the second process) is performed by the OS. For transition from the power state S0 to the power state S5 or G3, the process for writing information to disable the WOL function to the WOL setting areas in the network adapters 42 and 84 is also executed in the step 212.

When the preprocessing for shutting down the computer system 10 is all completed, the shutdown process by the OS is carried out in the next step 214. This shutdown process is preformed by writing predetermined information to the internal register PM CTL REG of the power management unit 68 at a predetermined address.

Whereupon, the power management unit 68 detects that instructions have been given to shut down the computer system 10, it makes active (low level) both the signal -SUSC output to the power circuit 54 (a signal indicating that the computer system 10 is in a power-off state (corresponding to a power-off instruction), refer to FIG. 3) and the signal -SUSB (a signal indicating that the computer system 10 is in a suspend state or power-off state, refer to FIG. 3).

The hardware operation by the output of the above described signals depends on whether the shutdown reset logic 52 is enabled or disabled. If the shutdown reset logic 52 is disabled, the usual shutdown sequence is executed, and the signals sent or received between the power management unit 68 and the power circuit 54 are directly transmitted by the shutdown reset logic 52, thereby for enabling the activated signal -SUSC (and the signal -SUSB) to be directly inputted to the power circuit 54, passing through the power-off signal gate logic 56 relaying the signal -SUSC and the signal -SUSB, and upon receipt of this, the power circuit 54 stops the supply of power to the computer system 10 (step 218). This causes the computer system 10 to move from the power state S0 to the power state S5 or G3.

On the other hand, if the shutdown reset logic 52 is enabled, the power-off signal gate logic 56 of the shutdown reset logic 52 interrupts the transmission of the signals inputted from the power management unit 68 (called a signal -SUSC#PIIX4 and a signal -SUSB#PIIX4, respectively) to the power circuit 54. This allows the signal -SUSC inputted to the power circuit 54 to be maintained inactive (high level) (step 220).

Figure 6:
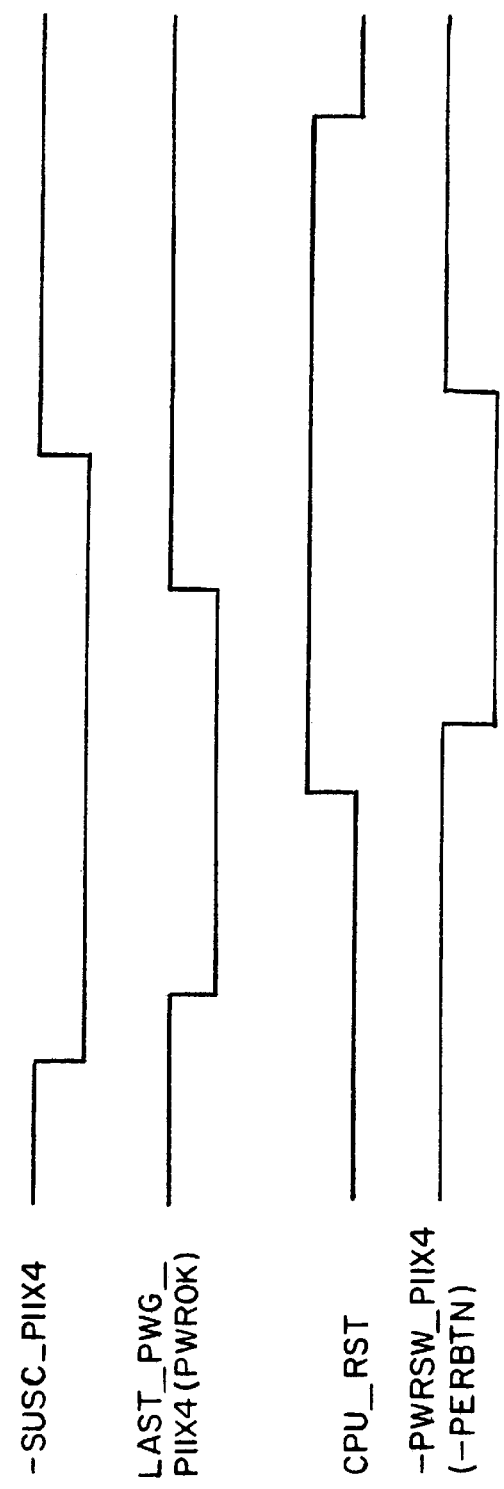
FIG. 6 is a timing chart for explaining the operation of the shutdown reset logic.

Further, the power circuit 54 outputs a signal LAST#PWG representing the state of power supply to the computer system 10 (which is active (high level) while the state of power supply is stable) to the power management unit 68, and if the shutdown reset logic 52 is enabled, the power good signal control logic 58, which relays the signal LAST#PWG output from the power circuit 54 to the power management 68 as the signal LAST#PWG#PIIX4, inactivates (makes low level) a LAST#PWG#PIIX4 output to the power management unit 68 after a predetermined time since the signal -SUSC#PIIX4 having become active (low level), independently of the level of the signal LAST#PWG inputted from the power circuit 54 (a dummy power state signal representing a faulty power state: also refer to step 222 and FIG. 6).

If the power management unit 68 detects that the signal inputted to the terminal PWROK (the signal LAST#PWG#PIIX4 output from the power good signal control logic 58) has become inactive, it determines that the supply of power to the computer system 10 has become unstable, and it rewrites the computer system's power state held in the internal register PM CTL REG depending on the determination result, and makes active (high level) the signal CPU#RST for generating a hardware reset for a predetermined time (also refer to step 224 and FIG. 6).

The signal CPU#RST output from the power management unit 68 is inputted to the power good signal control logic 58 and the power switch signal control logic 60, respectively. The power switch signal control logic 60 is connected to a power switch 92 via a diode 90, and by the operation of the power switch 92, the signal -PWRSW changing in the level is relayed to the power management unit 68 as the signal -PWRSW#PIIX4. When the power switch signal control logic 60 detects that the signal CPU#RST has become active, if the shutdown reset logic 52 is enabled, it makes active (low level) the signal -PWRSW#PIIX4 output to the power management unit 68 independently of the level of the signal -PWRSW (a dummy power-on signal: also refer to step 226 and FIG. 6).

Further, when the power good signal control logic 58 detects that the signal -CPU#RST has become active, if the shutdown reset logic 52 is enabled, it restores the signal LAST#PWG#PIIX4 output to the power management unit 68 from inactive (low level) to active (high level) (a dummy power state signal representing a good power state: refer to step 228 and FIG. 6).

When the power management unit 68 detects that the signal inputted to the terminal -PWRBTN (the signal -PWRSW#PIIX4 output from the power switch signal control logic 60) has become active (low level), it determines that the power switch 92 has been turned on, and switches the signals -SUSC and -SUSB (-SUSC#PIIX4 and signal -SUSB#PIIX4) to inactive (high level) (refer to step 230 and also to FIG. 6). Furthermore, when it detects that the signal inputted to the terminal PWROK (signal LAST#PWG#PIIX4) has become active, it determines that the supply of power to the computer system 10 has become stable. And, it rewrites the computer system's power state held in the internal register PM CTL REG to a state corresponding to the result of the above described determination.

There has been a temporary mismatch between the computer system's power state held in the internal register PM CTL REG and the actual power state, because the power good signal control logic 58 has changed the level of the signal -PWRSW#PIIX4 output to the power management unit 68, but the above described process provides a match with the actual power state.

The signal -SUSC#PIIX4 output from the power management unit 68 is also inputted to the power switch signal control logic 60. If the power switch signal control logic 60 detects that the signal -SUSC#PIIX4 has become inactive (high level) after making active the signal -PWRSW#PIIX4 output to the power management unit 68, it makes the signal -PWRSW#PIIX4 inactive (high level) (refer to FIG. 6).

After a predetermined time elapses since the power management unit 68 made the signal CPU#RST active, the signal CPU#RST is made again inactive (low level) by the power management unit 68 (step 230). By the above described sequence, the shutdown reset for generating a hardware reset is realized for the power-off instruction (shutdown instruction) output from the power management unit 68, without stopping the supply of power to the computer system 10, and when the signal CPU#RST becomes inactive, the POST programs sequentially stored from a predetermined address of the flash ROM 72 are read out and sequentially executed by the CPU 14, thereby to start the POST (the process routine related to the present invention) (step 232), and the processes in the next steps 234–244 (the processes corresponding to the processing means related to the present invention) are carried out.

In step 234, the value of the flag held in the shutdown reset bit is checked, and in the next step 236, it is determined based on the value of the above described flag whether or not the current start of the POST is due to a shutdown reset. The flag held in the shutdown reset bit of the CMOS 74 has been changed to a value indicating that a shutdown reset has been performed by the PM BIOS, only if the shutdown reset has been carried out.

Thus, if the flag held in the shutdown reset bit of the CMOS 74 is not a value indicating that a shutdown reset has been made, it can be determined that the current start of the POST is not due to a shutdown reset, so the determination in step 236 is denied. In this case, the processes for normally starting the computer system 10 (such as the usual process of the POST and the boot process of the OS) are carried out.

On the other hand, if the flag held in the shutdown reset bit of the CMOS 74 is a value indicating that a shutdown reset has been done, it can be determined that the current start of the POST is due to a shutdown reset, so the determination in step 236 is affirmed and step 238 is entered. In step 238, by writing information representing the enabling of the WOL function to the WOL setting area in the internal register of the network adapter 42 (or the network adapter 84), the WOL function of the network adapter 42 (or the network adapter 84) is enabled.

In step 240, the shutdown reset logic 52 is disabled via the GPIO 88, and in the next step 242, the flag held in the shutdown reset bit of the CMOS 74 is turned off (changed to a value indicating that no shutdown reset has been made). In the next step 244, a shutdown process by the BIOS (POST) is carried out. This shutdown process can also be performed by writing predetermined information to a predetermined address of the internal register PM CTL REG of the power management unit 68, as in the previously described step 214.

With this, the power management unit 68 makes active (low level) the signal -SUSC and the signal -SUSB, but, since the shutdown reset logic 52 has been disabled in the previous step 240, the signal -SUSC and the signal -SUSB are directly inputted to the power circuit 54, passing through the power-off signal gate logic 56 (step 246), the supply of power to the computer system 10 is stopped (step 218), and the computer system 10 moves from the power state S0 to the power state S5 or G3.

When the POST is started with a shutdown reset, the supply of power to the computer system 10 is stopped without the OS being started, and thus, the WOL function of the network adapter enabled in step 238 is not disabled by the OS, so the WOL function maintained in a usable state.

And, when the execution of the WOL is indicated through the network, the network adapter 42 (or the network adapter 84) makes the signal line -PME active, because the WOL function is enabled even when the computer system 10 is in the power state S5 or G3. By this, the gate array logic 76 detects that the signal line -PME has become active, and the signal -PWRON02 is inputted from the gate array logic 76 to the power management unit 68 and power circuit 54 through the OR circuit 86, restoring the computer system 10 to the power state S0. Accordingly, the WOL function can be used even if the computer system 10 is any power state.

Further, the time from the start of the operation of the shutdown reset logic 52 to the power-off of the computer system 10 (the time from step 220 to step 248) is very short, and thus, the load put on the CPU 14 can be reduced as compared with the mode in which I/O trap function is used to cause an interruption each time the internal register PM CTL REG is accessed, determination is made each time as to whether or not is the timing just before the power-off of the computer system 10, and the WOL function of the network adapter is enabled if it is determined to be the timing just before the power-off of the computer system 10.

In the foregoing, an SMI (interruption) is caused by the method PTS of the AML to start PM BIOS and the execution of a shutdown reset is stored in the CMOS 74 by the PM BIOS, but, for instance, if a nonvolatile memory means accessible by the AML, such as a register connected to a backup power supply, is newly provided, the execution of a shutdown reset may be stored in the above described memory means by the AML without starting the PM BIOS.

Further, the description has been made, by way of example, to the case in which the processes of enabling the WOL function, disabling the shutdown reset logic 52, turning off the shutdown reset bit, and shutting down the computer system 10 are carried out by the POST started with the shutdown reset, but, alternatively, all or part of the above described processes may be carried out, for instance, by the PM BIOS started when an SMI is caused by the POST.

Moreover, as the core chip including the power management unit, chips other than PIIX4 can be used, and it is not limited to PIIX4.

Furthermore, in the above described description, the present invention has been applied to the mode in which the WOL function of the network adapter is enabled in a computer compliant with the ACPI standard (a computer in which an OS that does not support the WOL function is operating), but this is not a limitation, and the present invention is widely applicable to cases in which, when the power of a computer system is turned off, a special process (for instance, a process which is not supported by the OS) is carried out after the process by the OS is terminated. Further, since the POST is started by the shutdown reset when the power of the computer system is turned off, it s also applicable to the direct operation of resources which are usually managed by the OS. As an example, the present invention can also be applied to the mode in which information such as the status of a device such as a network or hard disk, and the power-off time is previously stored in a CMOS or EEPROM when the power of the computer system is turned off, and the above described stored information is used at the next power-on time. In addition, it is also applicable to the case in which, because of a hardware trouble or the like, it is desired to firmly shut down the computer system by causing a reset at the power-off time.

The advantages of the invention as described above are that the present invention interrupts the inputting of a power-off instruction to the power unit when the power-off instruction is output to the power unit, generates a hardware reset of the computer, and turns off the power of the computer after executing a predetermined process in a processing routine started by the hardware reset, so it has an excellent advantage that the execution of the predetermined process just before the turn-off of the power of the computer can be realized without inviting increase in the load.

I claim:

1. A computer comprising:
   a controller: for interrupting an input of a power-off instruction into a power management unit to supply power to the computer when the power-off instruction is output to the power unit in response to an instruction from an operating system, and for generating a hardware signal of said computer;

wherein said power management unit controls a power state of said computer, said controller is disposed between said power management unit and said power unit, said contoller: interrupts the input of the power-off instruction output from said power management unit into said power unit, outputs a dummy power-on signal, representing an instruction of power-on, to said power management unit subsequent to generation of a hardware reset by outputting a dummy power state signal, representing an invalid power state, to said power management unit; and processing means for turning off the power of said computer after executing a predetermined process, said processing means being started by the hardware reset signal;

and wherein said processing means enables said controller and stores predetermined information into a nonvolatile memory when the execution of a predetermined process is instructed and the execution of a power-off process of said computer by an operating system is detected, and turns off said power of said computer after executing said predetermined process and disabling the operation of said controller if said computer is started by the hardware reset and said predetermined information is stored in memory.

2. The computer according to claim 1, wherein said predetermined process is a process which changes the setting of a network adapter to enable a function for turning on the power of a computer through a network from a remote site.

3. The computer according to claim 1 wherein said computer is compliant with the ACPI standard.

4. A power control method for computer comprising the steps of:
   using a controller for interrupting the inputting of a power-off instruction to a power management unit for supplying power to a computer when the power-off instruction is output to the power unit in accordance with instruction from an operating system, and generating a hardware signal of said computer; wherein said power management unit controls a power state of said computer, said controller is disposed between said power management unit and a power unit, said controller: interrupts the input of the power-off instruction output from said power management unit into said power unit, outputs a dummy power-on signal, representing an instruction of power-on, to said power management unit subsequent to generation of a hardware reset by outputting a dummy power state signal, representing an invalid power state, to said power management unit; and turning off the power of said computer after executing a predetermined process, with a process routine using processing means started by a hardware reset;

and wherein said processing means enables said controller and stores predetermined information into a nonvolatile memory when the execution of a predetermined process is instructed and the execution of a power-off process of said computer by an operating system is detected, and turns off said power of said computer after executing said predetermined process and disabling the operation of said controller if said computer is started by the hardware reset and said predetermined information is stored in memory.

* * * * *